United States Patent
Sugiyama

(10) Patent No.: US 11,543,918 B1
(45) Date of Patent: Jan. 3, 2023

(54) INPUT APPARATUS, INPUT METHOD, AND RECORDING MEDIUM RECORDING INPUT PROGRAM

(71) Applicant: SHARP KABUSHIKI KAISHA, Sakai (JP)

(72) Inventor: Koichi Sugiyama, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/834,250

(22) Filed: Jun. 7, 2022

(30) Foreign Application Priority Data

Jun. 16, 2021 (JP) .............................. JP2021-100090

(51) Int. Cl.
  *G06F 3/042* (2006.01)
  *G06F 3/041* (2006.01)
  *G06F 3/0482* (2013.01)
  *G06F 3/0488* (2022.01)

(52) U.S. Cl.
  CPC ........ *G06F 3/04186* (2019.05); *G06F 3/0425* (2013.01); *G06F 3/0482* (2013.01); *G06F 3/0488* (2013.01)

(58) Field of Classification Search
  CPC .. G06F 3/04186; G06F 3/0425; G06F 3/0482; G06F 3/0488

USPC ......................................................... 345/178
See application file for complete search history.

(56) References Cited

U.S. PATENT DOCUMENTS

2014/0023230 A1 * 1/2014 Huang .................. G06V 40/20
  382/103

FOREIGN PATENT DOCUMENTS

JP            H09-185456 A        7/1997

* cited by examiner

*Primary Examiner* — Amare Mengistu
*Assistant Examiner* — Gloryvid Figueroa-Gibson
(74) *Attorney, Agent, or Firm* — ScienBiziP, P.C.

(57) ABSTRACT

An input apparatus includes: an operation position determination device that determines an operation position of a gesture operation by a user; a movement vector calculator that calculates a movement vector at an input position on the basis of a movement amount of the operation position when the operation position moves; an input processor that executes first input processing at the input position at the time when a first gesture operation is detected, and executes second input processing at the input position at the time when a second gesture operation is detected; and a movement vector corrector that corrects the movement vector in the case where a change from the first gesture operation to the second gesture operation is determined.

17 Claims, 16 Drawing Sheets

INPUT APPARATUS, INPUT METHOD, AND RECORDING MEDIUM RECORDING INPUT PROGRAM

INCORPORATION BY REFERENCE

This application is based upon and claims the benefit of priority from the corresponding Japanese Patent Application No. 2021-100090 filed on Jun. 16, 2021, the entire contents of which are incorporated herein by reference.

BACKGROUND

The present disclosure relates to an input apparatus that accepts input through a gesture operation by a user on a display screen, an input method, and a recording medium that records an input program.

Conventionally, an input apparatus that enables input (a screen operation) through a gesture operation on a display screen of a display panel has been known. For example, the following interface device has been known. When a user puts one finger up toward equipment, an icon of number "1" is shown on a display, and display of a TV as a first item on a menu is highlighted. When the user puts two fingers up, the icon of number "2" is shown on the display, and display of a network as a second item on the menu is highlighted. When the user keeps the same hand shape for a certain period of time, the first item or the second item on the menu is selected.

Here, for example, the input apparatus identifies a position on the display screen (an input position) that is instructed through the gesture operation by the user's hand on the basis of a position of his/her hand (an operation position). For example, the input apparatus identifies, as the input position, a position of the user's finger joint, a center (center of gravity) position of an entire region where the user's hand during the gesture operation is projected, or the like. However, this method causes such a problem that the input position is changed in a direction unintended by the user in the case where the user changes his/her operation from an operation to open his/her hand (a first gesture operation) to an operation to close (clench) his/her hand (a second gesture operation), for example.

SUMMARY

An object of the present disclosure is to provide an input apparatus that detects a gesture operation by a user, executes input processing with respect to an input position on a display screen, and can prevent the input position from being changed by a change in the gesture operation by the user, an input method, and a recording medium that records an input program.

An input apparatus according to one aspect of the present disclosure is an input apparatus that detects a gesture operation by a user and executes input processing with respect to an input position on a display screen, and includes: a gesture operation detector that detects the gesture operation by the user; an operation position determination device that determines an operation position of the gesture operation detected by the gesture operation detector; a movement vector calculator that calculates a movement vector to move the input position on the basis of a movement amount of the operation position when the operation position moves, the movement vector including a movement direction and a movement amount; an input processor that executes first input processing at the input position at the time when the gesture operation detector detects a first gesture operation by the user, and executes second input processing at the input position at the time when the gesture operation detector detects a second gesture operation by the user; a gesture operation change determination device that determines a change from the first gesture operation to the second gesture operation; and a movement vector corrector that corrects the movement vector in the case where the gesture operation change determination device determines the change from the first gesture operation to the second gesture operation.

An input method according to another aspect of the present disclosure is an input method for detecting a gesture operation by a user and executing input processing with respect to an input position on a display screen, and causes one or plural processors to execute: gesture operation detection to detect the gesture operation by the user; operation position determination to determine an operation position of the gesture operation, which is detected in the gesture operation detection; movement vector calculation to calculate a movement vector to move the input position on the basis of a movement amount of the operation position when the operation position moves, the movement vector including a movement direction and a movement amount; inputting to execute first input processing at the input position at the time of detecting a first gesture operation by the user in the gesture operation detection and execute second input processing at the input position at the time of detecting a second gesture operation by the user in the gesture operation detection; gesture operation change determination to determine a change from the first gesture operation to the second gesture operation; and movement vector correction to correct the movement vector when determining the change from the first gesture operation to the second gesture operation in the gesture operation change determination.

A recording medium according to yet another aspect of the present disclosure is a recording medium that records an input program for detecting a gesture operation by a user and executing input processing with respect to an input position on a display screen, and causes one or plural processors to execute: gesture operation detection to detect the gesture operation by the user; operation position determination to determine an operation position of the gesture operation, which is detected in the gesture operation detection; movement vector calculation to calculate a movement vector to move the input position on the basis of a movement amount of the operation position when the operation position moves, the movement vector including a movement direction and a movement amount; inputting to execute first input processing at the input position at the time of detecting a first gesture operation by the user in the gesture operation detection and execute second input processing at the input position at the time of detecting a second gesture operation by the user in the gesture operation detection; gesture operation change determination to determine a change from the first gesture operation to the second gesture operation; and movement vector correction to correct the movement vector when determining the change from the first gesture operation to the second gesture operation in the gesture operation change determination.

According to the present disclosure, it is possible to provide the input apparatus that detects the gesture operation by the user, executes the input processing with respect to the input position on the display screen, and can prevent the input position from being changed in a direction unintended by the user by the change in the gesture operation by the user, an input method, and a recording medium that records an input program.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A description will hereinafter be made on an embodiment of the present disclosure with reference to the accompanying drawings. The following embodiment is an example that embodies the present disclosure, and does not intend to limit the technical scope of the present disclosure.

Figure 1:
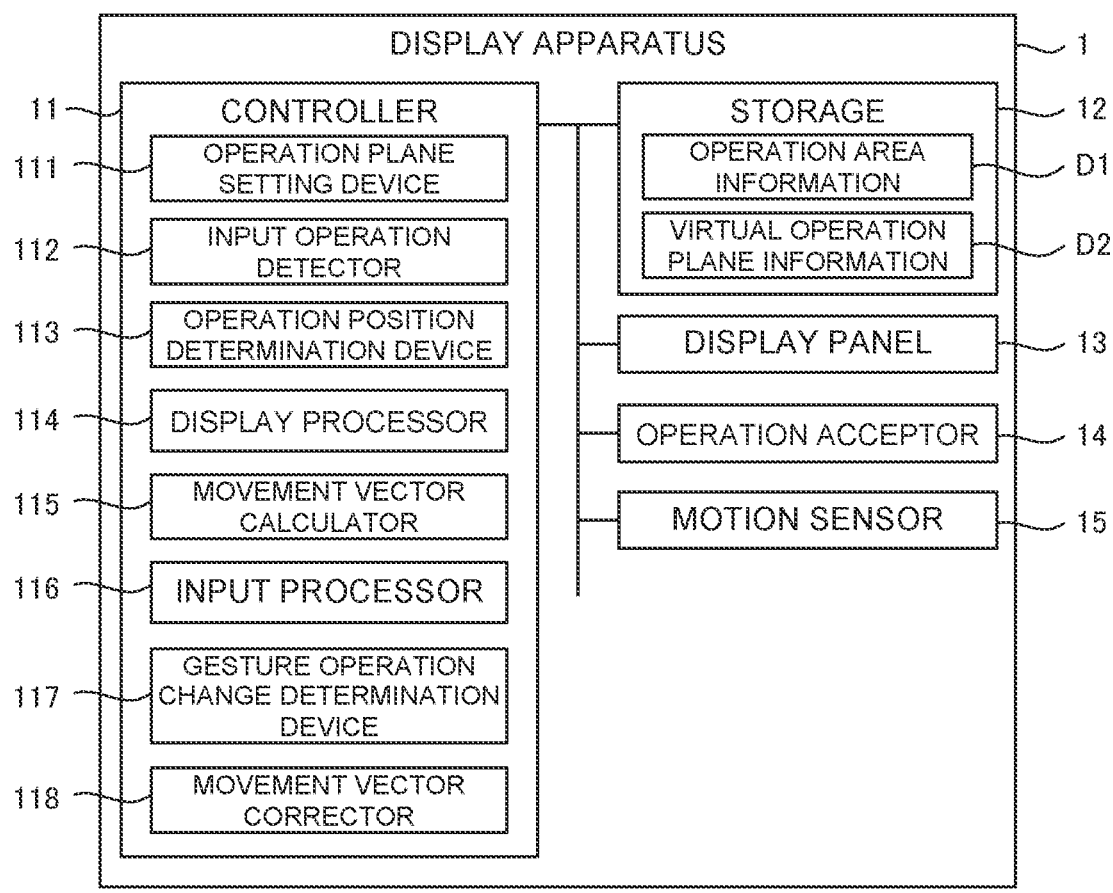
FIG. 1 is a block diagram illustrating a configuration of a display apparatus according to an embodiment of the present disclosure.
Figure 2:
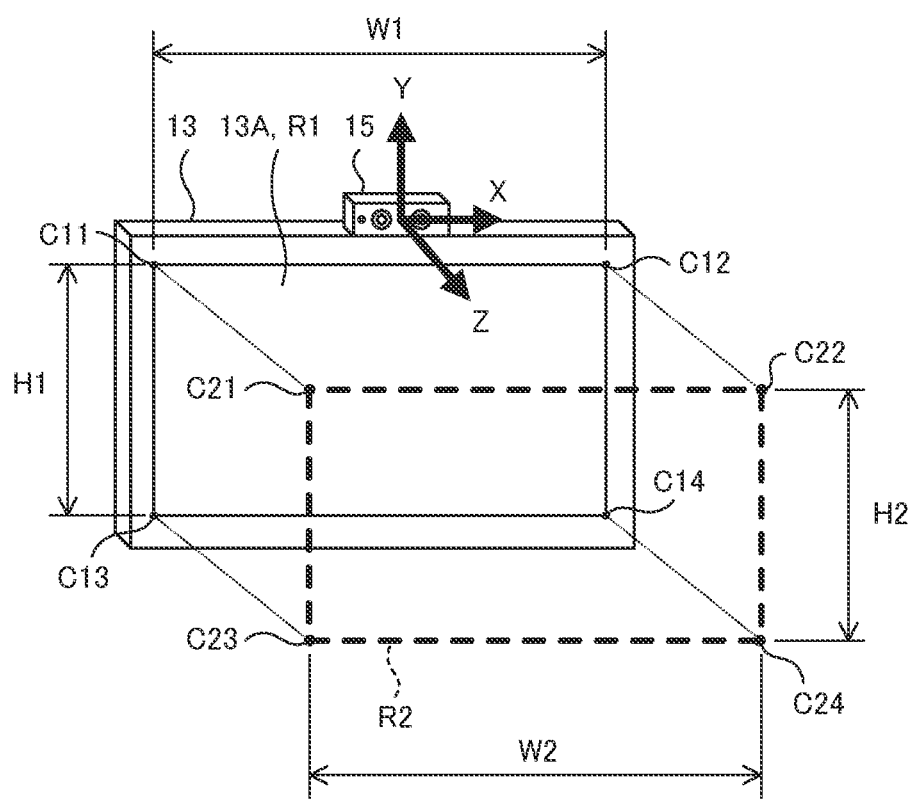
FIG. 2 is a schematic view illustrating an example of a virtual operation plane in the display apparatus according to the embodiment of the present disclosure.

As illustrated in FIG. 1, a display apparatus 1 according to the embodiment of the present disclosure includes a controller 11, a storage 12, a display panel 13, an operation acceptor 14, and a motion sensor 15. FIG. 2 is a schematic view of the display apparatus 1. The motion sensor 15 is installed on top of the display panel 13 to detect an input operation by a user.

The display apparatus 1 accepts the non-contact input operation (for example, a gesture operation) by the user for a display screen 13A. For example, when detecting the input operation by the user on a virtual operation plane R2, the display apparatus 1 executes input processing that corresponds to the input operation by the user for the display screen 13A. For example, in the case where the user performs an operation to touch a predetermined position of the virtual operation plane R2, the display apparatus 1 detects a position (an input position), which corresponds to the touch position (an operation position) on the virtual operation plane R2, on the display screen 13A and accepts touch input. In addition, the display apparatus 1 detects the gesture operation by the user and executes the input processing with respect to the input position on the display screen 13A. The display apparatus 1 is an example of the input apparatus in the present disclosure. A description will hereinafter be made on a specific configuration of the display apparatus 1.

For example, the motion sensor 15 includes two cameras and three infrared LEDs, and detects the input operation by the user within a predetermined detection range. The motion sensor 15 outputs detection information to the controller 11. The detection information includes position coordinates (an X-coordinate, a Y-coordinate, and a Z-coordinate) of a detection target (for example, the user's hand, the user's fingertip, a stylus pen, a pointer, or the like) with the motion sensor 15 being a reference. For example, the motion sensor 15 can detect the back (palm) of the user's hand (right hand RH or left hand LH) and joints of the user's fingers as well as skeletons, angles, positions, and the like of the user's hand and fingers. A well-known technique can be applied to the motion sensor 15. The motion sensor 15 and the cameras are an example of the imager in the present disclosure.

The display panel 13 is a display that shows an image, and is a liquid-crystal display, for example. The operation acceptor 14 is an operation device including a mouse and a keyboard, for example. Alternatively, the operation acceptor 14 may constructed of a touch panel.

The storage 12 is a non-volatile storage such as a hard disk drive (HDD) or a solid state drive (SSD) that stores various types of information. More specifically, the storage 12 stores data such as operation region information D1 and virtual operation plane information D2.

The operation region information D1 is information on an operation region R1 in the display screen 13A of the display panel 13. The operation region R1 is, in the display screen 13A, a region where the user can perform the input operation via the virtual operation plane R2, that is, a region that can accept the input operation by the user. The operation region R1 may be set for an entire region of the display screen 13A or may be set for a partial region of the display screen 13A. For example, in the case where the entire region of the display screen 13A is set as the operation region R1, the operation region information D1 includes, as coordinate information that defines the operation region R1, information on coordinates C11 to C14 (see FIG. 2) of four corners of the display screen 13A. The operation region information D1 is registered in the storage 12 each time the operation region R1 is set or updated.

The virtual operation plane information D2 is information on a region, which accepts the input operation by the user for the display screen 13A, in the virtual operation plane R2. More specifically, the virtual operation plane R2 corresponds to the operation region R1, and coordinates C21 to C24 (see FIG. 2) of four corners that define the virtual operation plane R2 respectively correspond to the coordinates C11 to C14 that define the operation region R1. The virtual operation plane information D2 includes information on the coordinates C21 to C24 of the four corners that define the virtual operation plane R2. The virtual operation plane information D2 is registered in the storage 12 each time the virtual operation plane R2 is set or updated. Size and a position of the virtual operation plane R2 may be set in advance or may be set by the user's operation.

In addition, the storage 12 stores a control program such as a display control program for causing the controller 11 to execute display control processing (see FIG. 7), which will be described below. For example, the display control program is recorded in a non-transitory manner in a computer-readable recording medium such as a CD or a DVD, is read by a reader (not illustrated) such as a CD drive or a DVD drive provided in the display apparatus 1, and is stored in the storage 12. The display control program may be distributed from a cloud server and stored in the storage 12.

The controller 11 includes control devices such as a CPU, ROM, and RAM. The CPU is a processor that executes various types of calculation processing. The ROM is a non-volatile storage that stores, in advance, control programs such as BIOS and OS to cause the CPU to execute the various types of the calculation processing. The RAM is a volatile or non-volatile storage that stores the various types of the information, and is used as temporary storage memory (a workspace) for various types of the processing executed by the CPU. The controller 11 causes the CPU to execute the various control programs, which are stored in the ROM or the storage 12 in advance, to control the display apparatus 1.

Here, in the related art, a position on the display screen 13A (the input position) that is instructed through the gesture operation by the user's hand is identified on the basis of a position of his/her hand (the operation position). For example, the conventional display apparatus identifies, as the input position, a position of the user's finger joint, a center (center of gravity) position of the entire region where the user's hand during the gesture operation is projected, or the like. However, this method causes such a problem that the input position is changed in a direction unintended by the user in the case where the user changes his/her operation from an operation to open his/her hand (a first gesture operation) to an operation to close his/her hand (a second gesture operation), for example. A description will hereinafter be made on a specific example of this problem.

Figure 3:
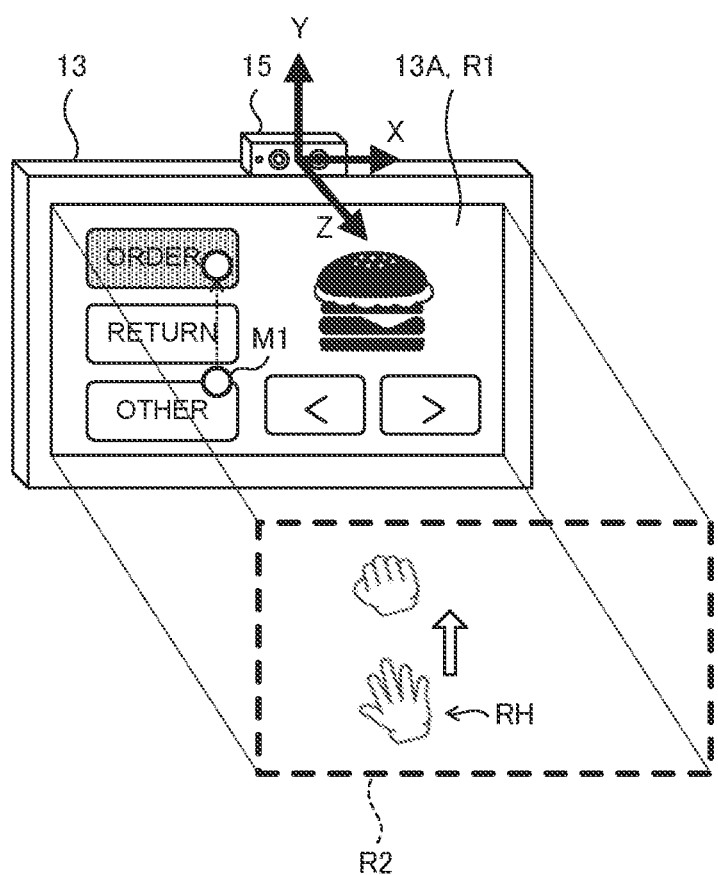
FIG. 3 is a view illustrating an example of an input operation in a conventional display apparatus.
Figure 4A:
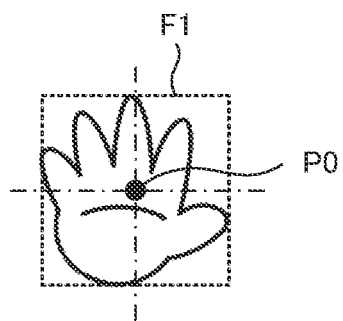
FIG. 4A is a view illustrating an example of an operation position of the input operation in the conventional display apparatus.
Figure 4B:
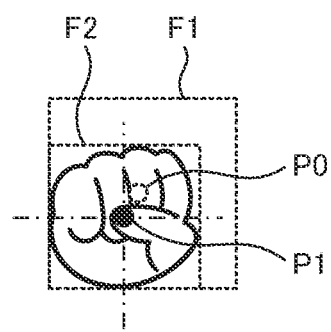
FIG. 4B is a view illustrating another example of the operation position of the input operation in the conventional display apparatus.
Figure 5:
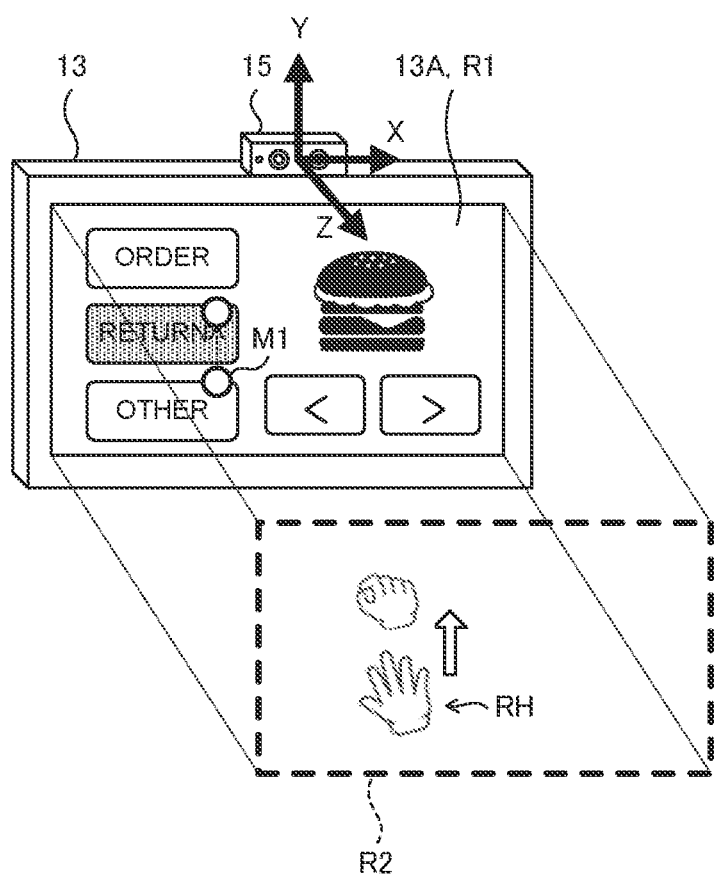
FIG. 5 is a view illustrating another example of the input operation in the conventional display apparatus.

FIG. 3 to FIG. 5 are views for explaining the problem caused by the related art. For example, selection button images such as "ORDER", "RETURN", and "OTHER" are shown as selection target images on a product order screen illustrated in FIG. 3. Then, when, on the virtual operation plane R2, the user performs an operation (the first gesture operation) to hold the palm of the right hand RH to the display screen 13A and moves the right hand RH in vertical and horizontal directions (an X-direction and a Y-direction), an input operation icon M1 on the display screen 13A moves according to the movement operation. When ordering a desired product, in order to press the selection button image "ORDER" that is shown on the display screen 13A, the user performs an operation (the second gesture operation) to close the right hand RH in a state where the input operation icon M1 overlaps the selection button image "ORDER". As a result, the user can perform an operation to select (order) the desired product.

Here, as illustrated in FIG. 4A, the conventional display apparatus identifies, as the input position, a center (center of gravity) position P0 (the operation position) of an entire region F1 where the user's hand (in an opened state) is projected. Thus, as illustrated in FIG. 4B, when the user closes his/her hand, the operation position moves from the center position P0 of the entire region F1 to a center position P1 of an entire region F2. Consequently, the input position on the display screen 13A is also changed according to the movement of the operation position. A movement vector including a movement amount and a movement direction of the input position is calculated on the basis of a movement amount of the operation position (a movement amount from the center position P0 to the center position P1).

Accordingly, for example, as illustrated in FIG. 5, in the case where the user keeps the palm of the right hand RH open on the virtual operation plane R2, moves the right hand RH in the vertical and horizontal directions (the X-direction and the Y-direction), and performs the operation to close the right hand RH in the state where the input operation icon M1 overlaps the selection button image "ORDER", the input position possibly moves downward, and an operation to press the selection button image "RETURN" is possibly accepted. Just as described, in the related art, there is a problem that the input position moves in the direction unintended by the user in conjunction with a change in the gesture operation by the user. On the contrary, as will be described below, the display apparatus 1 according to the present embodiment can prevent the change in the input position in the direction unintended by the user due to the change in the gesture operation by the user.

More specifically, as illustrated in FIG. 1, the controller 11 includes various processing devices such as an operation plane setting device 111, an input operation detector 112, an operation position determination device 113, a display processor 114, a movement vector calculator 115, an input processor 116, a gesture operation change determination device 117, and a movement vector corrector 118. Here, the controller 11 functions as the operation plane setting device 111, the input operation detector 112, the operation position determination device 113, the display processor 114, the movement vector calculator 115, the input processor 116, the gesture operation change determination device 117, and the movement vector corrector 118 when the CPU executes the various types of the processing according to the display control program. Some or all of the processors provided in the controller 11 may be constructed of an electronic circuit. The display control program may be a program that causes the plural processors to function as the various processors.

The operation plane setting device 111 sets the virtual operation plane R2 that accepts the input operation by the user. For example, as illustrated in FIG. 2, the operation plane setting device 111 sets the virtual operation plane R2 at a position that is away from the display screen 13A by a predetermined distance in the Z-direction. The operation plane setting device 111 may set the virtual operation plane R2 in a preset size at a preset position, or may set the virtual operation plane R2, whose size corresponds to the user's operation, at a position specified by the user. Although details will be described below (see "Method for Setting Virtual Operation Plane"), for example, the user can set the virtual operation plane R2 in the desired size at the desired position by performing a predetermined gesture operation.

The input operation detector 112 detects the input operation that includes the predetermined gesture operation by the user. More specifically, the input operation detector 112 detects the input operation by the user on the virtual operation plane R2, which is set by the operation plane setting device 111. For example, the input operation detector 112 detects detection coordinates (the operation position) on the virtual operation plane R2 on the basis of the detection information acquired from the motion sensor 15, and calculates input coordinates (the input position) in the operation region R1 from the detection coordinates. The input operations include the gesture operation to execute the predetermined input processing, a drawing operation to draw a hand-drawn image on the display screen 13A, and the like. The input operation detector 112 is an example of the gesture operation detector according to the present disclosure.

Here, in the case where a ratio of the virtual operation plane R2 to the operation region R1 is set as "W2:W1=H2:H1=a:b" (see FIG. 2), the input operation detector 112 can calculate input coordinates [dx, dy] by equations, dx=sx×b/a and dy=sy×b/a, on the basis of detection coordinates [sx, sy] on the virtual operation plane R2. Here, display resolution [rx, ry] is Min[dx, dy]=[0, 0] and Max[dx, dy]=[dx, dy].

A description will herein be made on a specific example of a case where the input operation detector 112 detects the gesture operation.

For example, when desiring to move the input operation icon M1 (for example, a mouse cursor image) shown on the display screen 13A, the user performs the first gesture operation. The first gesture operation is the user's operation to open the right hand RH (for example, an operation to pick "paper" by the right hand RH for rock paper scissors) in front of the display screen 13A, for example. In addition, for example, when desiring to select (click) the selection target with the input operation icon M1 shown on the display screen 13A, the user performs the second gesture operation. The second gesture operation is the user's operation to close the right hand RH (for example, an operation to pick "rock" by the right hand RH for rock paper scissors) in front of the display screen 13A, for example. The input operation detector 112 detects the first gesture operation and the second gesture operation.

The combination of the first gesture operation and the second gesture operation is not limited to the above-described example. For example, the first gesture operation may be a posture of putting up an index finger of the right hand RH, and the second gesture operation may be a posture of closing the right hand RH. The first gesture operation may be a posture of raising the opened right hand RH vertically, and the second gesture operation may be a posture of tilting the opened right hand RH 90 degrees. The first gesture operation may be a posture of opening the right hand RH, and the second gesture operation may be a posture of making a thumbs-up by the right hand RH or a posture of making an OK sign by the right hand RH.

The input operation detector 112 also detects a third gesture operation that approximates (is similar to) the first gesture operation and the second gesture operation. The third gesture operation is, for example, a gesture operation in the middle of a change from the first gesture operation to the second gesture operation, and is a gesture of making a shape between the "paper" shape and the "stone" shape by the right hand RH, for example.

The input operation detector 112 detects the first gesture operation, the second gesture operation, or the third gesture operation on the basis of hand and finger information that includes at least one of the skeleton, the angle, and the position of the user's hand and fingers. The input operation detector 112 detects the first gesture operation, the second gesture operation, or the third gesture operation on the basis of a degree of clenching Gn (will be described below) of the hand in accordance with the hand and finger information. For example, the input operation detector 112 sets a first threshold of the degree of clenching Gn that corresponds to the first gesture operation in advance, and detects the first gesture operation when the detected degree of clenching Gn is lower than the first threshold. In addition, for example, the input operation detector 112 sets a second threshold (here, the first threshold<the second threshold) of the degree of clenching Gn that corresponds to the second gesture operation in advance, and detects the second gesture operation when the detected degree of clenching Gn is equal to or higher than the second threshold. Furthermore, the input operation detector 112 detects the third gesture operation when the detected degree of clenching Gn is equal to or higher than the first threshold and is lower than the second threshold.

The storage 12 stores, in advance, setting information in which the predetermined gesture operation is associated with an operation content corresponding to the gesture operation. For example, the first gesture operation and the third gesture operation are associated with the movement operation of the input operation icon M1, and the second gesture operation is associated with the selection operation (the click operation) by the input operation icon M1. The predetermined gesture operation may include a gesture operation (see "Method for Setting Virtual Operation Plane" below) for setting the virtual operation plane R2. In addition, the predetermined gesture operation may be set individually for each user using the display apparatus 1.

The operation position determination device 113 determines the operation position of the gesture operation, which is detected by the input operation detector 112, on the virtual operation plane R2 for the gesture operation. More specifically, the operation position determination device 113 determines a reference point of the gesture operation on the basis of a captured image of the gesture operation, which is captured by the motion sensor 15, and determines the operation position on the basis of the position of the reference point. The operation position determination device 113 determines, as the reference point, a center of gravity position of the captured image of the gesture operation, which is captured by the motion sensor 15. For example, the operation position determination device 113 creates first hand and finger information on at least one of the skeleton, the angle, and the position of the user's hand and fingers on the basis of the captured image of the gesture operation, which is captured by the motion sensor 15, and determines a position of the reference point on the basis of the first hand and finger information. The center position P0 illustrated in FIG. 4A and the center position P1 illustrated in FIG. 4B are examples of the reference point.

The display processor 114 shows the various types of the information on the display screen 13A of the display panel 13. For example, the display processor 114 shows, on the display screen 13A, an image of the input operation icon M1 (the mouse cursor image), the images of the selection targets that can be selected by the user operating the input operation icon M1 (for example, the selection button images "ORDER", "RETURN", and "OTHER" in FIG. 3), and the like. In addition, the display processor 114 shows the input operation icon M1 at the input position that corresponds to the operation position determined by the operation position determination device 113.

Figure 6:
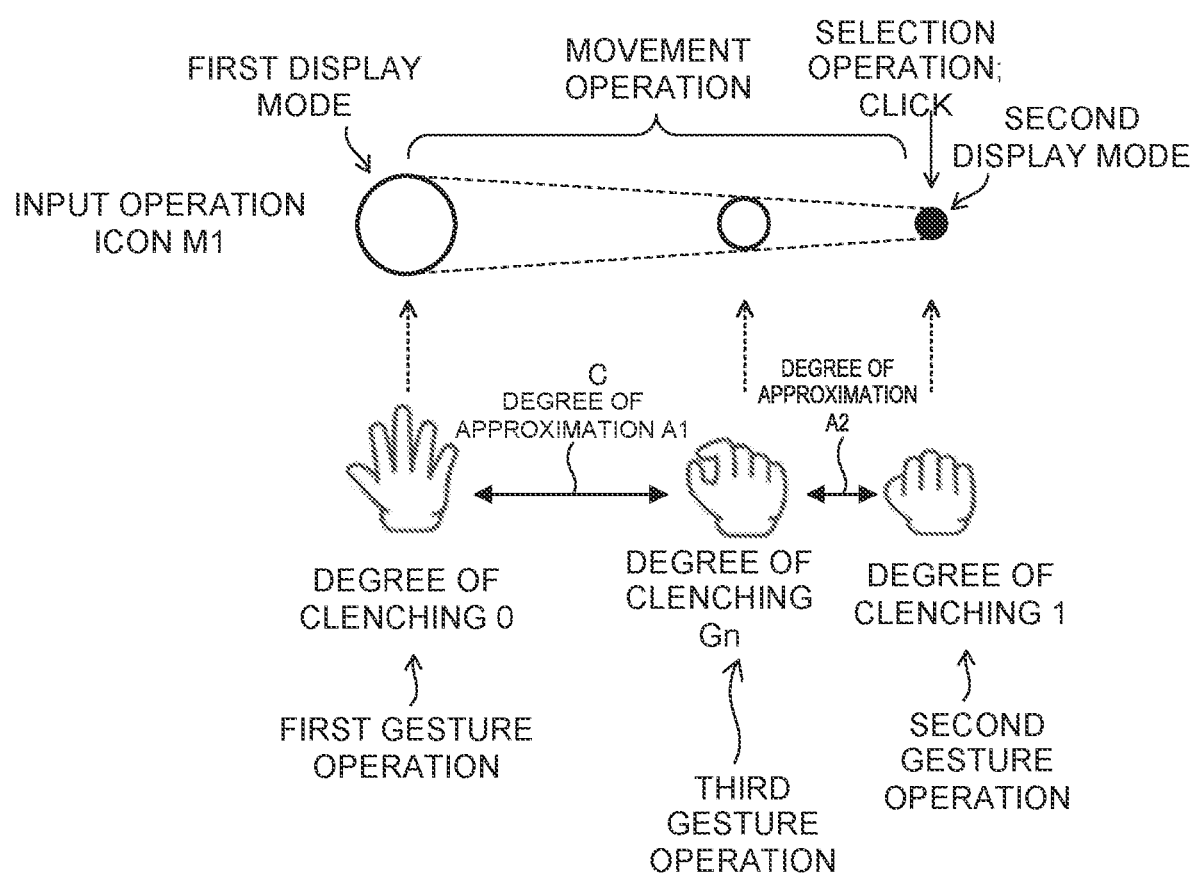
FIG. 6 is a view illustrating a circumstance where a gesture operation and a display mode of an input operation icon are changed in the display apparatus according to the embodiment of the present disclosure.

The display processor 114 may show the input operation icon M1 in a different display mode according to a type of gesture operation. For example, in the case where the input operation detector 112 detects the first gesture operation by the user, the display processor 114 shows the input operation icon M1 in a first display mode on the display screen 13A. In addition, in the case where the input operation detector 112 detects the second gesture operation by the user, the display processor 114 shows the input operation icon M1 in a second display mode on the display screen 13A. More specifically, as illustrated in FIG. 6, in the case where the input operation detector 112 detects the first gesture operation (the posture of "paper") by the user, the display processor 114 shows the input operation icon M1 in first size (dimensions) and a first color (white). Meanwhile, in the case where the input operation detector 112 detects the second gesture operation (the posture of "stone") by the user, the display processor 114 shows the input operation icon M1 in second size, which is smaller than the first size, and a second color (black).

In the case where the operation position of the gesture operation by the user moves, the movement vector calculator 115 calculates the movement vector, which includes the movement direction and the movement amount in/with which the input position moves, on the basis of the movement amount of the operation position. For example, as illustrated in FIG. 4A and FIG. 4B, in the case where the user changes the gesture operation from the state of opening his/her hand to the state of closing his/her hand, the movement vector calculator 115 calculates the movement direction and the movement amount (the movement vector) of the input position on the basis of a movement direction and a movement amount of the reference point (the center positions P0, P1) that corresponds to the operation position. Here, the movement vector calculator 115 converts the movement vector at the operation position into the movement vector at the input position on the basis of the ratio of the virtual operation plane R2 to the operation region R1 (see FIG. 2), for example.

The input processor 116 executes the input processing at the input position that corresponds to the input operation by the user. The input processor 116 executes first input processing at the input position at the time when the input operation detector 112 detects the first gesture operation by the user, and executes second input processing at the input position at the time when the input operation detector 112 detects the second gesture operation by the user. For example, in the case where the input operation detector 112 detects the movement operation to move the input operation icon M1 according to the first gesture operation, the input processor 116 moves the input operation icon M1 on the display screen 13A. In addition, for example, in the case where the input operation detector 112 detects the selection operation to select the selection target by the input operation icon M1, the input processor 116 executes processing according to the selection target on the display screen 13A. For example, in the case where the input operation detector 112 detects the operation to select the selection button image "ORDER" on the display screen 13A, the input processor 116 executes order processing that is assigned to the selection button image "ORDER". Furthermore, in the case where the input operation detector 112 detects the drawing operation, the input processor 116 executes drawing processing to draw the hand-drawn image on the display screen 13A. The input processor 116 is an example of the input processor according to the present disclosure.

The gesture operation change determination device 117 determines the change from the first gesture operation to the second gesture operation. For example, the gesture operation change determination device 117 determines a change from the state where the user's hand is opened to the state where the user's hand is closed.

More specifically, the gesture operation change determination device 117 calculates a degree of approximation between the gesture operation by the user, which is detected by the input operation detector 112, (for example, the third gesture operation) and each of the first gesture operation (the state where the user's hand is opened) and the second gesture operation (the state where the user's hand is closed), and determines the change from the first gesture operation to the second gesture operation on the basis of the degree of approximation. For example, the gesture operation change determination device 117 creates second hand and finger information on at least one of the skeleton, the angle, and the position of the user's hand and fingers on the basis of the captured image of the gesture operation by the user, which is captured by the motion sensor 15, (the third gesture operation), and determines the degree of approximation on the basis of the second hand and finger information. For example, in the case where a time change amount of the degree of approximation is larger than a predetermined first reference value, the gesture operation change determination device 117 determines that the gesture operation has been changed from the first gesture operation to the second gesture operation.

A description will herein be made on an example of a method for determining the degree of approximation with reference to FIG. 6. For example, in the case where the input operation detector 112 detects the third gesture operation by the user, the gesture operation change determination device 117 calculates the degree of approximation between the third gesture operation and each of the first gesture operation and the second gesture operation. The gesture operation change determination device 117 calculates the degree of approximation on the basis of the second hand and finger information. The degree of approximation is an index indicating the degree of clenching Gn of the user's hand. FIG. 6 illustrates the degree of clenching Gn of the user's hand that is changed along with a time change.

For example, as illustrated in FIG. 6, the degree of clenching Gn is set to "0" (or 0 to 0.1) in the first gesture operation (the operation to open the hand), and the degree of clenching Gn is set to "1" (or 0.9 to 1) in the second gesture operation (the operation to clench the hand). The storage 12 stores, in advance, information on the degrees of clenching Gn corresponding to the first gesture operation and the second gesture operation, respectively. Here, when the input operation detector 112 detects the third gesture operation by the user, the gesture operation change determination device 117 calculates the degree of clenching Gn, which corresponds to the third gesture operation, on the basis of the second hand and finger information on at least one of the skeleton, the angle, and the position of the user's hand and fingers. It is indicated that the third gesture operation approximates the first gesture operation as the degree of clenching Gn becomes closer to "0", and that the third gesture operation approximates the second gesture operation as the degree of clenching Gn becomes closer to "1". Based on the degree of clenching Gn that corresponds to the third gesture operation, the gesture operation change determination device 117 calculates a degree of approximation A1 between the first gesture operation and the third gesture operation and a degree of approximation A2 between the second gesture operation and the third gesture operation. The gesture operation change determination device 117 determines the change from the first gesture operation to the second gesture operation on the basis of the degrees of approximation A1, A2. In addition, in the case where time change amounts of the degrees of approximation A1, A2 are larger than the predetermined first reference value, the gesture operation change determination device 117 determines that the gesture operation has been changed from the first gesture operation to the second gesture operation.

The movement vector corrector 118 corrects the movement vector in the case where the gesture operation change determination device 117 determines the change from the first gesture operation to the second gesture operation.

For example, the movement vector corrector 118 corrects the movement vector by subtracting a predetermined correction movement amount, which is set in advance, from the movement amount calculated by the movement vector calculator 115. Alternatively, for example, the movement vector corrector 118 corrects the movement vector by subtracting a correction movement vector, which includes a correction movement direction and a correction movement amount set in advance, from the movement vector calculated by the movement vector calculator 115. For example, plural combinations of the movement amount of the operating position of the gesture operation by the user and the correction movement amount corresponding to the movement amount may be registered in the storage 12 in advance. The movement vector corrector 118 refers to the storage 12 to acquire the correction movement amount that corresponds to the movement amount calculated by the movement vector calculator 115, and corrects the movement vector.

As another embodiment, the movement vector corrector 118 may correct the movement vector by multiplying the movement amount, which is calculated by the movement vector calculator 115, by a predetermined correction coefficient as a smaller value than 1, which is set in advance. For example, plural combinations of the movement amount of the operating position of the gesture operation by the user and t the correction coefficient corresponding to the movement amount may be registered in the storage 12 in advance. The movement vector corrector 118 refers to the storage 12 to acquire the correction coefficient that corresponds to the movement amount calculated by the movement vector calculator 115, and corrects the movement vector.

In addition, as another embodiment, the movement vector corrector 118 may correct the movement vector such that the movement amount becomes equal to or smaller than a predetermined upper limit value, which is set in advance, when the movement amount calculated by the movement vector calculator 115 is larger than the upper limit value. The upper limit may be registered in the storage 12 in advance. The movement vector corrector 118 executes correction processing to correct the movement vector in the case where the movement amount calculated by the movement vector calculator 115 is larger than the upper limit value. According to such a configuration, the correction processing is executed only when necessary. Thus, a processing load can be reduced.

As described above, the movement vector corrector 118 corrects the movement vector in a manner to offset the movement of the input position, which occurs when the reference point is changed from a position of the reference point (the center position P0 in FIG. 4A) for the first gesture operation to a position of the reference point (the center position P1 in FIG. 4B) for the second gesture operation.

Here, in the case where the gesture operation change determination device 117 is configured to determine that the gesture operation has been changed from the first gesture operation to the second gesture operation when the time change amount of the degree of approximation is larger than the predetermined first reference value, the movement vector corrector 118 may correct the movement vector until predetermined duration elapses from a time point at which it is determined that the time change amount of the degree of approximation is larger than the first reference value. In this way, the execution of the correction processing can be limited to the duration. Thus, the processing load can be reduced. The duration may be set in advance in a manner to correspond to a magnitude of the degree of approximation.

The movement vector corrector 118 may correct the movement vector from a time point at which it is determined that the time change amount of the degree of approximation is larger than the first reference value to a time point at which it is determined that the time change amount of the degree of approximation is equal to or smaller than the first reference value. In this way, it is possible to reliably reduce the movement amount of the movement vector to a predetermined amount.

In the case where the time change amount of the degree of approximation is larger than a predetermined second reference value, the movement vector corrector 118 may enhance a correction effect to correct the movement vector in comparison with a case where the time change amount of the degree of approximation is smaller than the second reference value. In this way, the movement vector can be corrected according to a degree of change in the gesture operation. Thus, the correction processing can be executed efficiently.

As described above, the position of the reference point can be fixed by executing the correction processing by the movement vector corrector 118 regardless of the change in the gesture operation by the user. Thus, it is possible to prevent the movement of the input position caused by the change in the gesture operation.

Display Control Processing

Figure 7:
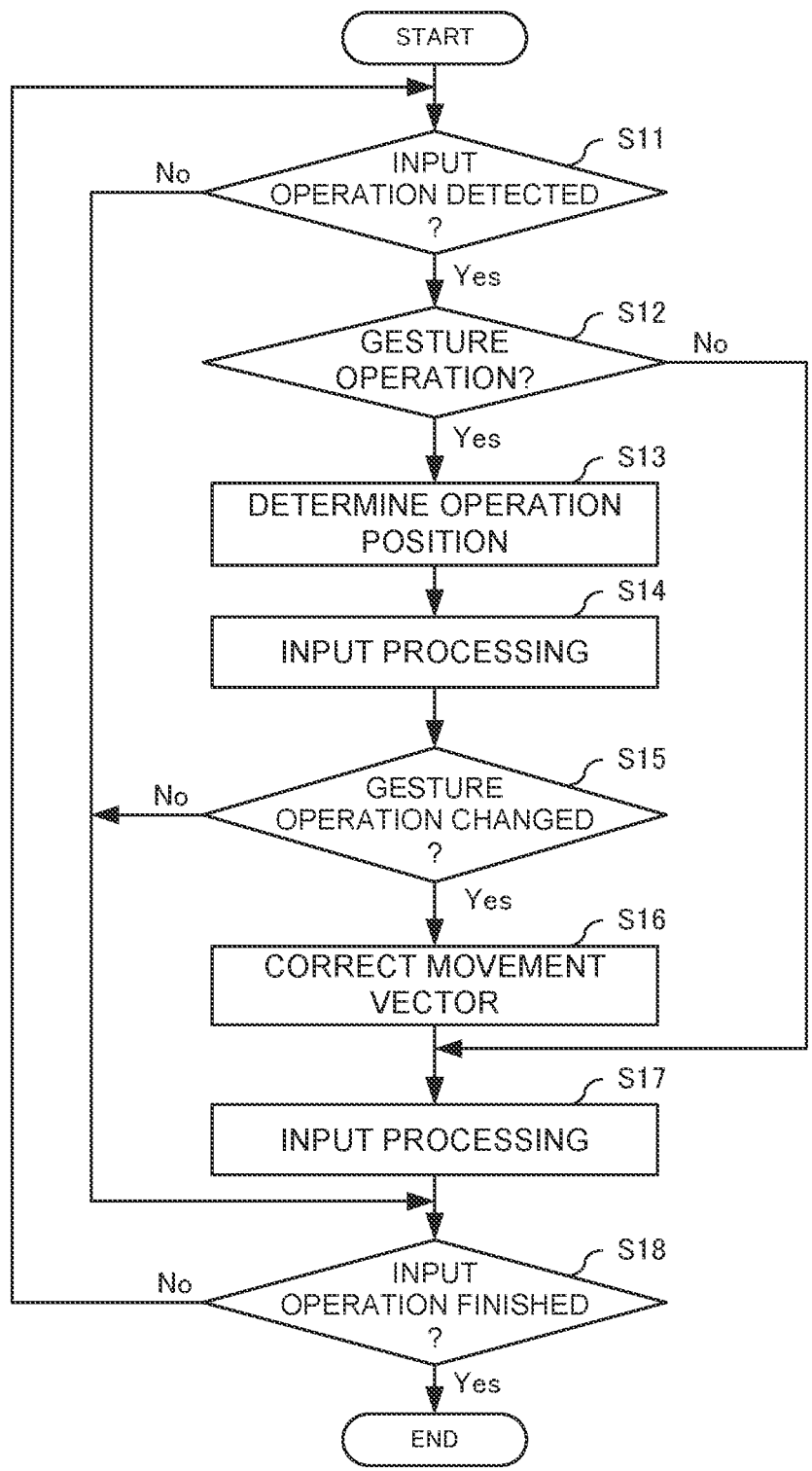
FIG. 7 is a flowchart for explaining an example of a procedure of display control processing that is executed in the display apparatus according to the embodiment of the present disclosure.

A description will hereinafter be made on the display control processing that is executed by the controller 11 of the display apparatus 1 with reference to FIG. 7.

The present disclosure can be regarded as disclosure of a display control method (an example of the input method in the present disclosure) for executing one or plural steps included in the display control processing, and one or plural steps included in the display control processing described herein may appropriately be omitted. The steps in the display control processing may be executed in a different order as long as a similar operational effect is exerted. Furthermore, a description will herein be made on a case where the controller 11 executes the steps in the display control processing as an example. However, the display control method in which the plural processors separately execute the steps in the display control processing is considered as another embodiment.

First, in step S11, the controller 11 determines whether the input operation by the user has been detected. More specifically, the controller 11 detects the input operation by the user on the virtual operation plane R2. For example, the controller 11 detects the detection coordinates on the virtual operation plane R2 on the basis of the detection information acquired from the motion sensor 15, and calculates the input coordinates in the operation region R1 of the display screen 13A from the detection coordinates. If the controller 11 has detected the input operation (S11: Yes), the processing proceeds to step S12. If the controller 11 has not detected the input operation (S11: No), the processing proceeds to step S18.

In step S12, the controller 11 determines whether the predetermined gesture operation by the user has been detected. For example, the controller 11 detects the operation to open the right hand RH (the operation to pick "paper" by the right hand RH) by the user or the operation to close the right hand RH (the operation to pick "rock" by the right hand RH) by the user on the basis of the hand and finger information on at least one of the skeleton, the angle, and the position of the user's hand and fingers. If the controller 11 has detected the gesture operation by the user (S12: Yes), the processing proceeds to step S13. On the other hand, if the controller 11 has not detected the gesture operation by the user (S12: No), the processing proceeds to step S17. Step S12 is an example of the gesture operation detection in the present disclosure.

Next, in step S13, the controller 11 determines the operation position of the gesture operation. More specifically, the controller 11 determines the reference point for the gesture operation on the virtual operation plane R2 on the basis of the captured image of the gesture operation, which is captured by the motion sensor 15, and then determines the operation position on the basis of the position of the reference point. For example, the controller 11 creates the first hand and finger information on at least one of the skeleton, the angle, and the position of the user's hand and fingers on the basis of the captured image of the gesture operation, which is captured by the motion sensor 15, determines the position of the reference point (for example, the center position P0 illustrated in FIG. 4A) on the basis of the first hand and finger information, and determines the operation position on the basis of the position of the reference point. Step S13 is an example of the operation position determination in the present disclosure.

In addition, in step S13, the controller 11 shows the input operation icon M1 at the input position on the display screen 13A that corresponds to the operation position.

Next, in step S14, the controller 11 executes the input processing that corresponds to the gesture operation by the user. For example, when the user moves the right hand RH in the vertical and horizontal directions (the X-direction and the Y-direction) in the state of opening the right hand RH (the first gesture operation) on the virtual operation plane R2, the controller 11 accepts the movement operation and moves the input operation icon M1, which is shown on the display screen 13A, in a manner to follow the movement of the user's right hand RH. Step S14 is an example of the inputting in the present disclosure.

In step S14, in the case where the operation position of the gesture operation by the user moves, the controller 11 calculates the movement vector, which includes the movement direction and the movement amount in/with which the input position moves, on the basis of the movement amount of the operation position. The controller 11 calculates the movement vector at the input position on the basis of the movement vector at the operation position and moves the input operation icon M1 on the display screen 13A. Step S14 is an example of the movement vector calculation in the present disclosure.

Next, in step S15, the controller 11 determines whether the gesture operation has been changed. More specifically, the controller 11 calculates the degree of approximation between the detected gesture operation by the user and each of the first gesture operation (the state where the user's hand is opened) and the second gesture operation (the state where the user's hand is closed), and determines the change from the first gesture operation to the second gesture operation on the basis of the degree of approximation. For example, in the case where the time change amount of the degree of approximation is larger than the predetermined first reference value, the controller 11 determines that the detected gesture operation has been changed from the first gesture operation to the second gesture operation. If the gesture operation has been changed (S15: Yes), the processing proceeds to step S16. If the gesture operation has not been changed (S15: No), the processing proceeds to step S18. Step S15 is an example of the gesture operation change determination in the present disclosure.

Next, in step S16, the controller 11 corrects the movement vector of the input position. For example, the controller 11 corrects the movement vector by subtracting the predetermined correction movement amount, which is set in advance, from the movement amount of the input position that corresponds to the movement amount of the operation position of the gesture operation by the user.

Alternatively, the controller 11 may correct the movement vector by multiplying the calculated movement amount by the predetermined correction coefficient as the smaller value than 1, which is set in advance. In addition, the controller 11 may correct the movement vector such that the movement amount becomes equal to or smaller than the predetermined upper limit value, which is set in advance, when the calculated movement amount is larger than the upper limit value.

As described above, the controller 11 corrects the movement vector in the manner to offset the movement of the input position, which occurs when the reference point is changed from the position of the reference point (the center position P0 in FIG. 4A) for the first gesture operation to the position of the reference point (the center position P1 in FIG. 4B) for the second gesture operation. Step S16 is an example of the movement vector correction in the present disclosure.

Next, in step S17, the controller 11 executes the input processing that corresponds to the gesture operation by the user. For example, the controller 11 executes the input processing with the input operation icon M1 on the basis of the corrected movement vector. For example, when the controller 11 determines the change from the first gesture operation (the state where the user's hand is opened) to the second gesture operation (the state where the user's hand is closed) at the position where the input operation icon M1 overlaps the selection button image "ORDER" on the display screen 13A, the controller 11 offsets the change in the input position and executes the order processing that is assigned to the selection button image "ORDER".

Next, in step S18, the controller 11 determines whether the input operation has been finished. If the input operation has been finished (S18: Yes), the controller 11 finishes the display control processing. If the input operation has not been finished (S18: No), the processing returns to step S11.

The controller 11 executes the display control processing as described so far.

As it has been described so far, the display apparatus 1 according to the present embodiment detects the gesture operation by the user and determines the operation position of the detected gesture operation. In addition, in the case where the operation position has moved, the display apparatus 1 calculates the movement vector, which includes the movement direction and the movement amount in/with which the input position moves, on the basis of the movement amount of the operation position. The display apparatus 1 executes the first input processing at the input position at the time when the first gesture operation by the user is detected, and executes the second input processing at the input position at the time when the second gesture operation by the user is detected. The display apparatus 1 corrects the movement vector in the case where the change from the first gesture operation to the second gesture operation is determined. More specifically, the display apparatus 1 corrects the movement vector in the manner to offset the movement of the input position that is associated with the movement of the reference point for the gesture operation.

In this way, it is possible to prevent the change in the input position in the direction unintended by the user in the case where the user changes his/her operation from the operation to open his/her hand (the first gesture operation) to the operation to close (clench) his/her hand (the second gesture operation), for example.

Method for Setting Virtual Operation Plane

The operation plane setting device 111 may set the virtual operation plane R2 in the desired size as the desired position on the basis of a predetermined setting gesture operation by the user.

More specifically, the operation plane setting device 111 detects the setting gesture operation by the user. More specifically, the operation plane setting device 111 detects the setting gesture operation on the basis of the detection information acquired from the motion sensor 15. For example, the operation plane setting device 111 identifies the user's hand shape on the basis of the coordinate information included in the detection information, and identifies the corresponding gesture operation of the plural gesture operations, which are registered in the storage 12 in advance.

When detecting a predetermined first setting gesture operation by the user the operation plane setting device 111 sets the region corresponding to the first setting gesture operation as the virtual operation plane R2 for accepting the input operation by the user for the display screen 13A. The operation plane setting device 111 may set the virtual operation plane R2 in the case where the first setting gesture operation continues for a predetermined period of time. The first setting gesture operation is an operation to hold the palm of each of the left hand LH and the right hand RH toward the display screen 13A, for example. That is, the first setting gesture operation is a setting operation to set the virtual operation plane R2 by the user.

Figure 8:
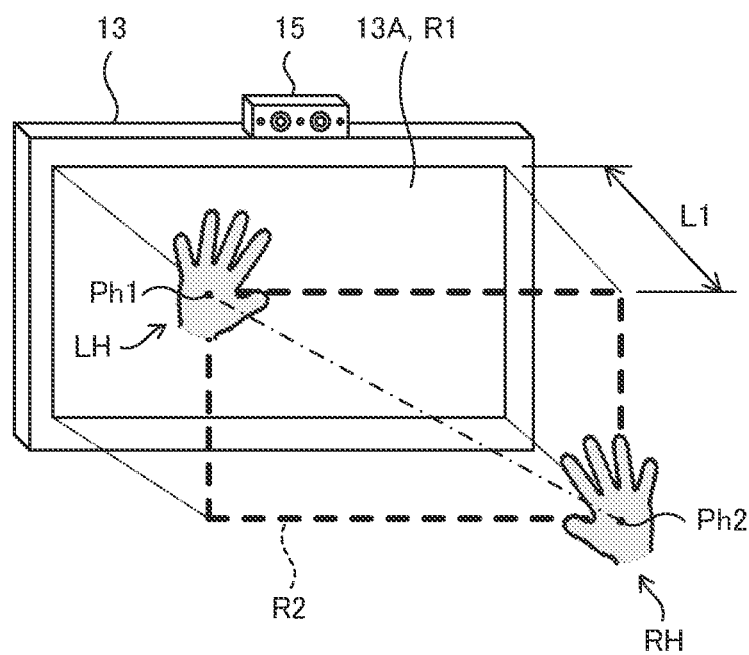
FIG. 8 is a view illustrating an example of a method for setting the virtual operation plane in the display apparatus according to the embodiment of the present disclosure.

For example, as illustrated in FIG. 8, when the user holds the palm of the left hand LH at an upper right position toward the display screen 13A and holds the palm of the right hand RH at a lower right position toward the display screen 13A, the operation plane setting device 111 detects coordinates Ph1 of the left hand LH, the coordinates Ph2 of the right hand RH, and the first setting gesture operation to hold the left hand LH and the right hand RH on the basis of the detection information acquired from the motion sensor 15. When detecting the first setting gesture operation, the operation plane setting device 111 sets the virtual operation plane R2 on the basis of the coordinates Ph1 of the left hand LH and the coordinates Ph2 of the right hand RH.

For example, as illustrated in FIG. 8, the operation plane setting device 111 sets the rectangular virtual operation plane R2 having, as a diagonal line, a line connecting the position of the left hand LH (the coordinates Ph1) and the position of the right hand RH (the coordinates Ph2). More specifically, the operation plane setting device 111 calculates the coordinates C21 to C24 (see FIG. 2) of corners of the rectangle on the basis of the coordinates Ph1 of the left hand LH and the coordinates Ph2 of the right hand RH, and sets the virtual operation plane R2.

For example, the operation plane setting device 111 sets the virtual operation plane R2 at a position that is away from the display screen 13A by a predetermined distance L1. The predetermined distance L1 is a distance that corresponds to the coordinate Ph1 (the Z-coordinate) of the left hand LH and the coordinate Ph2 (the Z-coordinate) of the right hand RH.

Figure 9:
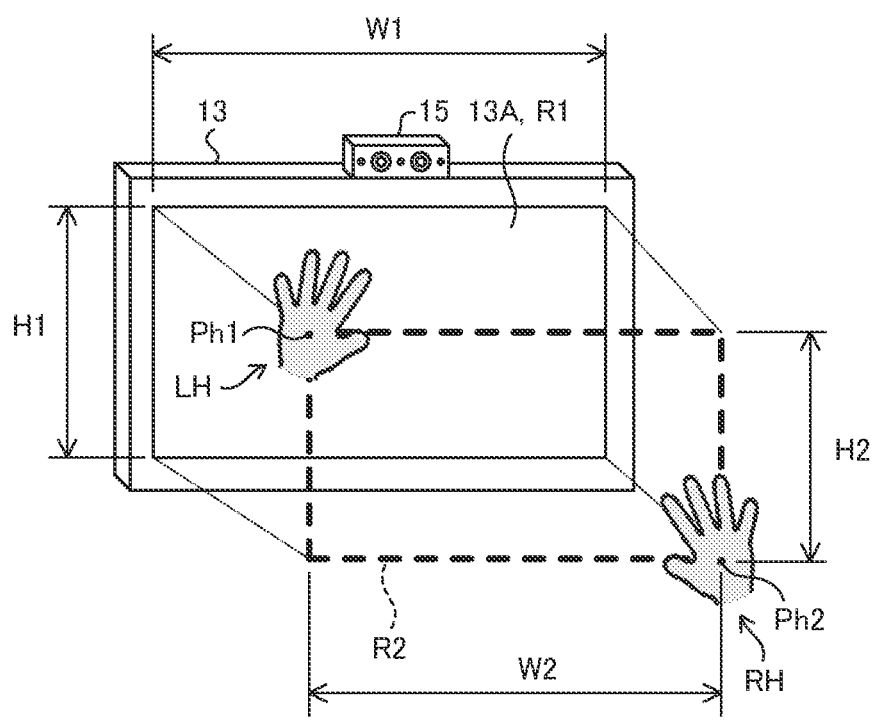
FIG. 9 is a view illustrating an example of the method for setting the virtual operation plane in the display apparatus according to the embodiment of the present disclosure.

For example, the operation plane setting device 111 may set the virtual operation plane R2 whose aspect ratio is the same as an aspect ratio of the display screen 13A. More specifically, as illustrated in FIG. 9, the operation plane setting device 111 sets such a virtual operation plane R2 that the aspect ratio (H1:W1) of the display screen 13A and the aspect ratio (H2:W2) of the virtual operation plane R2 are equal to each other (H1:W1=H2:W2).

As described above, the size of the display screen 13A (the operation region R1) and the size of the virtual operation plane R2 may be the same or differ from each other. Here, the virtual operation plane R2 that is smaller than the operation region R1 is suited for such application that the large-sized display panel 13 is operated at the user's hand. On the contrary, the virtual operation plane R2 that is larger than the operation region R1 is suited for such application that the small-sized display panel 13 is operated at a distance position.

Figure 10:
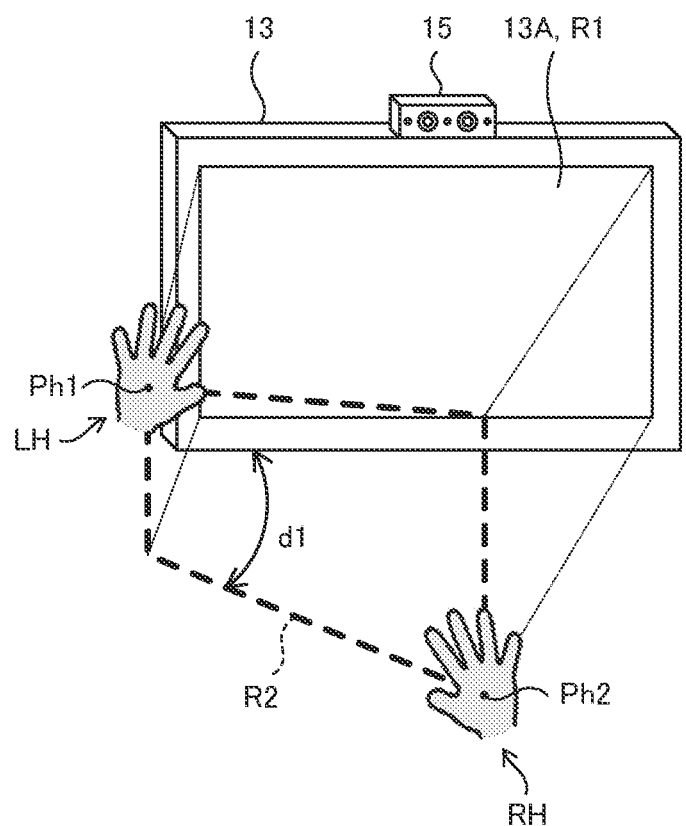
FIG. 10 is a view illustrating an example of the method for setting the virtual operation plane in the display apparatus according to the embodiment of the present disclosure.

As illustrated in FIG. 10, the operation plane setting device 111 may set the virtual operation plane R2 having a predetermined angle d1 that is not parallel to the display screen 13A. That is, the virtual operation plane R2 may be set in an oblique direction with respect to the display screen 13A. For example, the operation plane setting device 111 sets the predetermined angle d1 on the basis of the coordinate Ph1 (the Z-coordinate) of the left hand LH and the coordinate Ph2 (the Z-coordinate) of the right hand RH. In this way, the user can perform the input operation in the oblique direction with respect to the display screen 13A. The operation plane setting device 111 may show information on the predetermined angle d1 on the display screen 13A. In this way, the user can comprehend the angle (a degree of the inclination) of the virtual operation plane R2 with respect to the display screen 13A.

Figure 11:
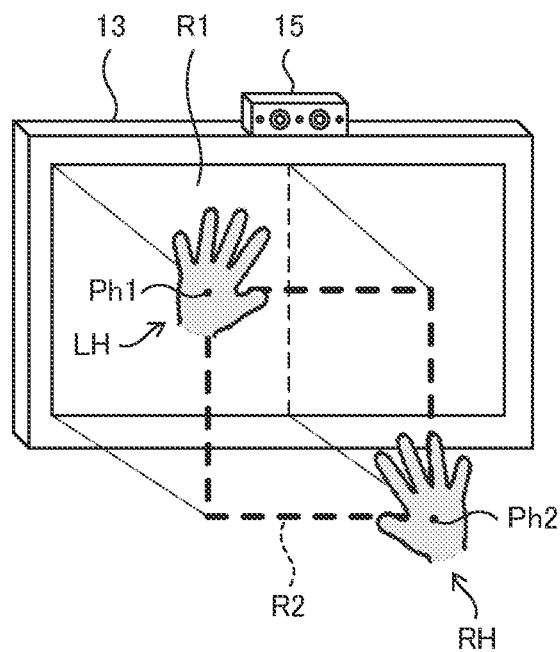
FIG. 11 is a view illustrating an example of the method for setting the virtual operation plane in the display apparatus according to the embodiment of the present disclosure.
Figure 12:
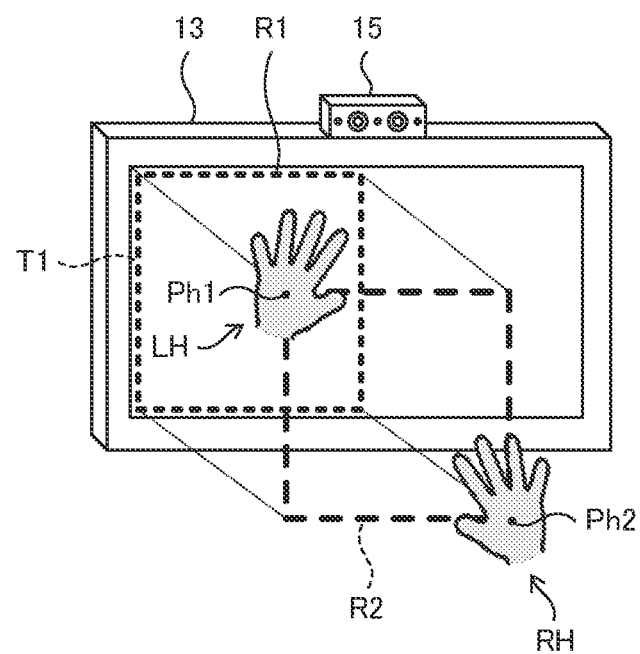
FIG. 12 is a view illustrating an example of the method for setting the virtual operation plane in the display apparatus according to the embodiment of the present disclosure.

The operation plane setting device 111 may set the virtual operation plane R2 that corresponds to the partial region of the display screen 13A. For example, as illustrated in FIG. 11, the operation plane setting device 111 sets the virtual operation plane R2 that corresponds to the operation region R1 as a part (a left region) of the display screen 13A. A position and size of the operation region R1 can be set by the setting operation by the user. Here, in order for the user who sets the virtual operation plane R2 to easily comprehend the operation region R1, as illustrated in FIG. 12, the operation plane setting device 111 may show an object image T1 indicating the operation region R1 on the display screen 13A at the time of setting the virtual operation plane R2.

The operation plane setting device 111 can use well-known coordinate transformation (projective transformation, affine transformation, or the like) to set the virtual operation plane R2, which is associated with the operation region R1 of the display screen 13A, on the basis of the coordinates corresponding to the first setting gesture operation.

The operation plane setting device 111 may execute processing to adjust the set virtual operation plane R2. More specifically, in the case where a predetermined second setting gesture operation by the user is detected after the virtual operation plane R2 is set, the operation plane setting device 111 changes at least one of the size and the position of the virtual operation plane R2 on the basis of the second setting gesture operation. The second setting gesture operation is a finger pointing operation (see FIG. 13) by the right hand RH, for example.

Figure 13:
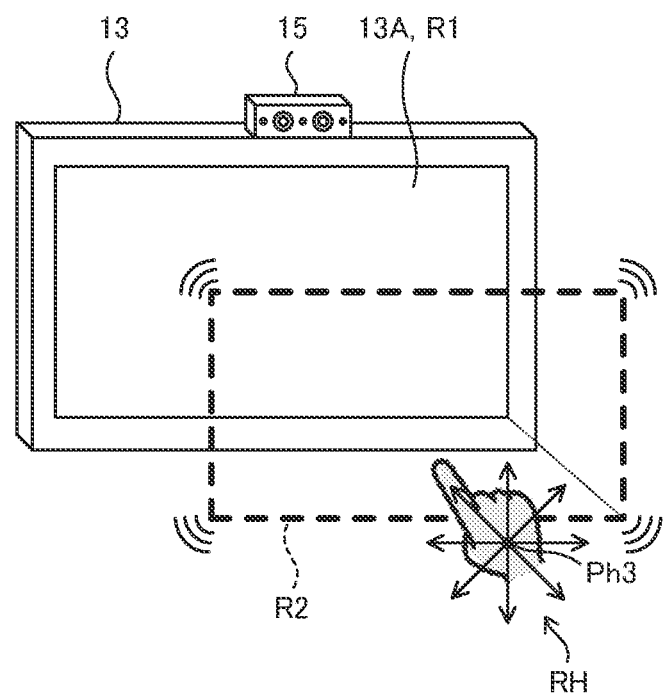
FIG. 13 is a view illustrating an example of the method for setting the virtual operation plane in the display apparatus according to the embodiment of the present disclosure.

For example, as illustrated in FIG. 13, in the case where the user performs the finger pointing operation by the right hand RH to point the display screen 13A after the virtual operation plane R2 is set, the operation plane setting device 111 detects coordinates Ph3 of the right hand RH and the second setting gesture operation that is the finger pointing operation by the right hand RH on the basis of the detection information acquired from the motion sensor 15. When detecting the second setting gesture operation, the operation plane setting device 111 sets the virtual operation plane R2 to be movable on the basis of the coordinates Ph3 of the right hand RH, and accepts the movement operation of the virtual operation plane R2 by the user. For example, when the user moves the right hand RH to the left while keeping the finger pointing state, the operation plane setting device 111 moves the virtual operation plane R2 to the left by an amount corresponding to the movement amount of the right hand RH. That is, the operation plane setting device 111 sets the virtual operation plane R2 at the coordinates Ph3 of the right hand RH that has moved.

Figure 14:
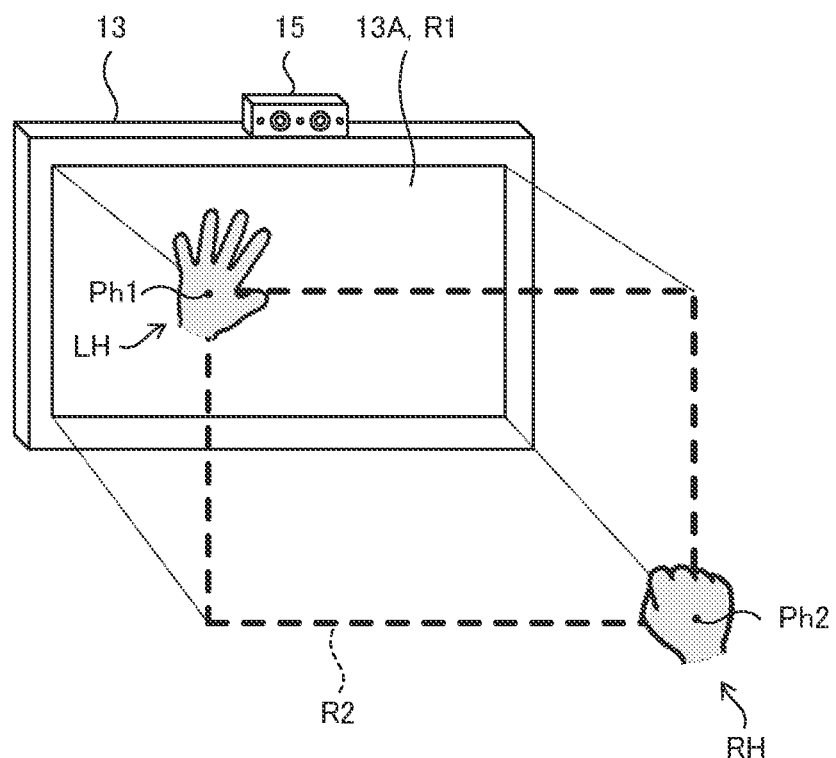
FIG. 14 is a view illustrating an example of the method for setting the virtual operation plane in the display apparatus according to the embodiment of the present disclosure.

For example, as illustrated in FIG. 14, in the case where the user performs the operation to clench the right hand RH while holding the left hand LH after the virtual operation plane R2 is set, the operation plane setting device 111 detects the coordinates Ph1 of the left hand LH, the coordinates Ph2 of the right hand RH, and the second setting gesture operation to hold the left hand LH and clench the right hand RH on the basis of the detection information acquired from the motion sensor 15. When detecting the second setting gesture operation, the operation plane setting device 111 sets the size of the virtual operation plane R2 to be changeable on the basis of the coordinates Ph2 of the right hand RH, and accepts the user's operation to change the size of the virtual operation plane R2. For example, when the user moves the right hand RH in a lower-right direction while clenching the right hand RH, the operation plane setting device 111 enlarges the size (an area) of the virtual operation plane R2 by an amount corresponding to the movement amount of the right hand RH. That is, the operation plane setting device 111 sets the virtual operation plane R2 that is defined by the coordinates Ph1 of the left hand LH and the coordinates Ph2 of the right hand RH that has moved.

Figure 15:
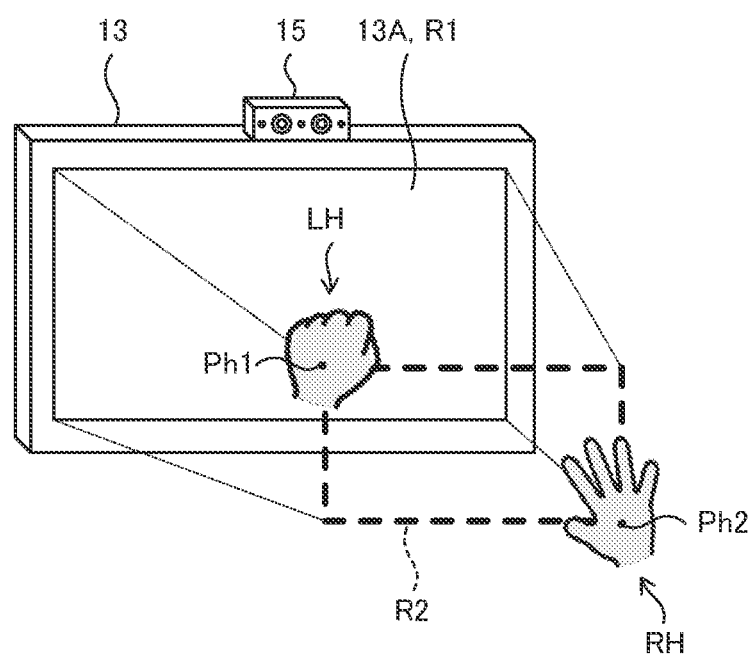
FIG. 15 is a view illustrating an example of the method for setting the virtual operation plane in the display apparatus according to the embodiment of the present disclosure.

FIG. 15 illustrates an example of the case where the user performs the operation to clench the left hand LH while holding the right hand RH after the virtual operation plane R2 is set. In this case, the operation plane setting device 111 detects the coordinates Ph1 of the left hand LH, the coordinates Ph2 of the right hand RH, and the second setting gesture operation to hold the right hand RH and clench the left hand LH on the basis of the detection information acquired from the motion sensor 15. When detecting the second setting gesture operation, the operation plane setting device 111 sets the size of the virtual operation plane R2 to be changeable on the basis of the coordinates Ph1 of the left hand LH, and accepts the user's operation to change the size of the virtual operation plane R2. For example, when the user moves the left hand LH in the lower-right direction while clenching the left hand LH, the operation plane setting device 111 reduces the size (the area) of the virtual operation plane R2 by the amount corresponding to the movement amount of the left hand LH. That is, the operation plane setting device 111 sets the virtual operation plane R2 that is defined by the coordinates Ph2 of the right hand RH and the coordinates Ph1 of the left hand LH that has moved.

Figure 16:
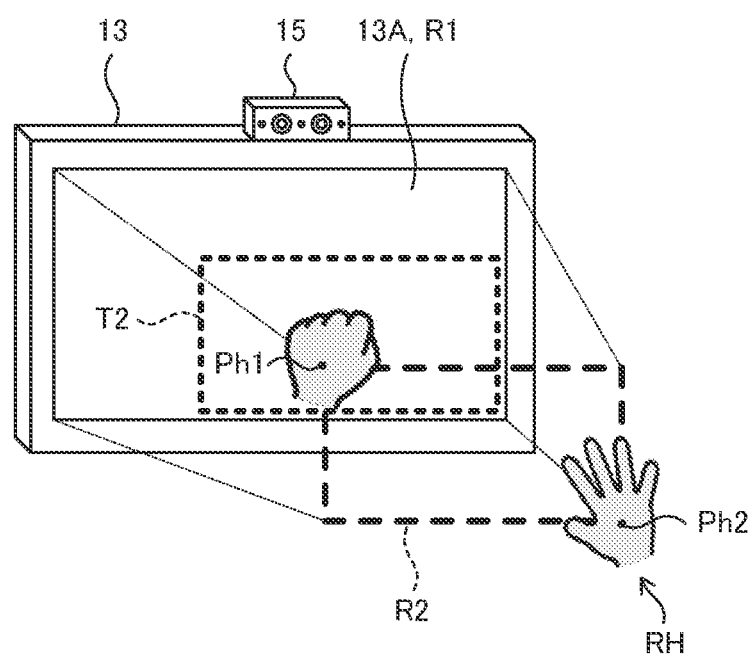
FIG. 16 is a view illustrating an example of the method for setting the virtual operation plane in the display apparatus according to the embodiment of the present disclosure.

In the case where the second setting gesture operation is detected after the virtual operation plane R2 is set, the operation plane setting device 111 may show an object image T2 indicating the virtual operation plane R2 on the display screen 13A in accordance with the second setting gesture operation. FIG. 16 illustrates an example of the object image T2 that indicates the virtual operation plane R2 after the size thereof is changed. According to such a configuration, the user can visually comprehend the size, the position, and the like of the virtual operation plane R2 that has changed.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An input apparatus that detects a gesture operation by a user and executes input processing with respect to an input position on a display screen, the input apparatus comprising:
    a gesture operation detector that detects the gesture operation by the user;
    an operation position determination device that determines an operation position of the gesture operation detected by the gesture operation detector;
    a movement vector calculator that calculates a movement vector to move the input position on the basis of a movement amount of the operation position when the operation position moves, the movement vector including a movement direction and a movement amount;
    an input processor that executes first input processing at the input position at the time when the gesture operation detector detects a first gesture operation by the user, and executes second input processing at the input position at the time when the gesture operation detector detects a second gesture operation by the user;
    a gesture operation change determination device that determines a change from the first gesture operation to the second gesture operation; and
    a movement vector corrector that corrects the movement vector in the case where the gesture operation change determination device determines the change from the first gesture operation to the second gesture operation.

2. The input apparatus according to claim 1, wherein the movement vector corrector corrects the movement vector by subtracting a predetermined correction movement amount, which is set in advance, from the movement amount calculated by the movement vector calculator.

3. The input apparatus according to claim 1, wherein the movement vector corrector corrects the movement vector by subtracting a correction movement vector, which is set in advance, from the movement vector calculated by the movement vector calculator, the correction movement vector including a correction movement direction and a correction movement amount.

4. The input apparatus according to claim 1, wherein the movement vector corrector corrects the movement vector by multiplying the movement amount, which is calculated by the movement vector calculator, by a predetermined correction coefficient, which is set in advance, the predetermined correction coefficient being a smaller value than 1.

5. The input apparatus according to claim 1, wherein in the case where the movement amount calculated by the movement vector calculator is larger than a predetermined upper limit value, which is set in advance, the movement vector corrector corrects the movement vector such that the movement amount becomes equal to or smaller than the upper limit value.

6. The input apparatus according to claim 1 further comprising:
an imager that captures an image of the gesture operation, wherein
the operation position determination device determines a reference point for the gesture operation on the basis of a captured image of the gesture operation, which is captured by the imager, and determines the operation position on the basis of a position of the reference point.

7. The input apparatus according to claim 6, wherein the operation position determination device determines, as the reference point, a center of gravity position of the captured image of the gesture operation, which is captured by the imager.

8. The input apparatus according to claim 6, wherein the operation position determination device creates first hand and finger information on at least one of a skeleton, an angle, and a position of the user's hand and fingers on the basis of the captured image of the gesture operation, which is captured by the imager, and determines a position of the reference point on the basis of the first hand and finger information.

9. The input apparatus according to claim 6, wherein the movement vector corrector corrects the movement vector in a manner to offset movement of the input position, which occurs when the reference point is changed from a position of the reference point for the first gesture operation to a position of the reference point for the second gesture operation.

10. The input apparatus according to claim 1, wherein the gesture operation change determination device calculates a degree of approximation between the gesture operation by the user, which is detected by the gesture operation detector, and each of the first gesture operation and the second gesture operation, and determines the change from the first gesture operation to the second gesture operation on the basis of the degree of approximation.

11. The input apparatus according to claim 10 further comprising:
an imager that captures an image of the gesture operation, wherein
the gesture operation change determination device creates second hand and finger information on at least one of a skeleton, an angle, and a position of the user's hand and fingers on the basis of the captured image of the gesture operation by the user, which is captured by the imager, and determines the degree of approximation on the basis of the second hand and finger information.

12. The input apparatus according to claim 10, wherein in the case where a time change amount of the degree of approximation is larger than a predetermined first reference value, the gesture operation change determination device determines that the gesture operation has been changed from the first gesture operation to the second gesture operation.

13. The input apparatus according to claim 12, wherein the movement vector corrector corrects the movement vector until predetermined duration elapses from a time point at which it is determined that the time change amount of the degree of approximation is larger than the first reference value.

14. The input apparatus according to claim 13, wherein the movement vector corrector corrects the movement vector from the time point at which it is determined that the time change amount of the degree of approximation is larger than the first reference value to a time point at which it is determined that the time change amount of the degree of approximation is equal to or smaller than the first reference value.

15. The input apparatus according to claim 12, wherein in the case where the time change amount of the degree of approximation is larger than a predetermined second reference value, the movement vector corrector enhances a correction effect to correct the movement vector in comparison with a case where the time change amount of the degree of approximation is smaller than the second reference value.

16. An input method for detecting a gesture operation by a user and executing input processing with respect to an input position on a display screen, the method causing one or plural processors to:
detect the gesture operation by the user;
determine an operation position of the detected gesture operation;
calculate a movement vector to move the input position on the basis of a movement amount of the operation position when the operation position moves, the movement vector including a movement direction and a movement amount;
execute first input processing at the input position at the time of detecting a first gesture operation by the user and execute second input processing at the input position at the time of detecting a second gesture operation by the user;
determine a change from the first gesture operation to the second gesture operation; and
correct the movement vector when determining the change from the first gesture operation to the second gesture operation.

17. A non-transitory computer-readable recording medium that records an input program for detecting a gesture operation by a user and executing input processing with respect to an input position on a display screen, the non-transitory computer-readable recording medium recording the input program to cause one or plural processors to:
detect the gesture operation by the user;
determine an operation position of the detected gesture operation;
calculates a movement vector to move the input operation on the basis of a movement amount of the operation position when the operation position moves, the movement vector including a movement direction and a movement amount;
execute first input processing at the input position at the time of detecting a first gesture operation by the user and execute second input processing at the input position at the time of detecting a second gesture operation by the user;
determine a change from the first gesture operation to the second gesture operation; and correct the movement vector when determining the change from the first gesture operation to the second gesture operation.

\* \* \* \* \*